United States Patent [19]

Chang

[11] 3,715,665

[45] Feb. 6, 1973

[54] JOINT INITIAL SETTING OF ATTENUATOR COEFFICIENTS AND SAMPLING TIME IN AUTOMATIC EQUALIZERS FOR SYNCHRONOUS DATA TRANSMISSION SYSTEMS

[75] Inventor: Robert Wu-lin Chang, Middletown, N.J.

[73] Assignee: Bell Telephone Laboratories Incorporated, Murray Hill, N.J.

[22] Filed: June 15, 1971

[21] Appl. No.: 153,184

[52] U.S. Cl. .......................325/42, 325/65, 328/155, 333/18 R

[51] Int. Cl. ..............................................H03h 7/36

[58] Field of Search .......325/42, 65, 38 R; 178/69 R; 333/18 R, 17; 328/155, 162

[56] References Cited

UNITED STATES PATENTS

| | | | |
|---|---|---|---|
| 3,651,316 | 3/1972 | Gibson | ..............................325/42 X |
| 3,659,229 | 4/1972 | Milton | ..............................333/18 R |

*Primary Examiner*—Benedict V. Safourek
*Attorney*—R. J. Guenther et al.

[57] ABSTRACT

Method and apparatus for rapid joint setting in synchronous data transmission systems of the parameters of sampling time and transversal equalizer tap gain coefficients utilizes auxiliary delay means for a preliminary correlation of samples of transmitted test pulses and reference test pulses to obtain a signal which after application to the transversal equalizer generates an output wave whose peak coincides with the optimum sampling instant. This effect is assured by inversely orthogonalizing the tap output signals from the transversal equalizer. Once the optimum sampling time is established the tap gains can be set in a single adjustment to provide an open data eye pattern.

7 Claims, 3 Drawing Figures

INVENTOR
R. W. CHANG
BY J. P. Kearns
ATTORNEY

JOINT INITIAL SETTING OF ATTENUATOR COEFFICIENTS AND SAMPLING TIME IN AUTOMATIC EQUALIZERS FOR SYNCHRONOUS DATA TRANSMISSION SYSTEMS

FIELD OF THE INVENTION

This invention relates to the equalization of transmission channels for synchronous digital data and in particular to the rapid joint initial adjustment of the parameters of sampling time and equalizer tap gain.

BACKGROUND OF THE INVENTION

Automatic equalization of voiceband telephone channels by means of transversal filters has made high-speed digital data communication possible. Attention is now being directed to the prospective use of high-speed data sets in multiparty polling systems, such as airline reservation and on-line banking systems. For such applications messages tend to be short but frequent. Inasmuch, however, as transversal equalizers must be conditioned to a different transmission path for each message, the conditioning or start-up time required by conventional methods can equal or exceed the message transmission time.

The transversal filter equalizer comprises a tapped delay line with variable tap gain apparatus. During a start-up period prior to message data transmission, these tap gains are adjusted automatically to minimize either the peak distortion or the mean-square error determined from received test pulses or pseudorandom test sequences. There are several interdependent parameters which affect the convergence or settling time of transversal equalizers. They include sampling time, demodulating carrier frequency and demodulating carrier phase. These parameters must be taken into account before an optimum set of tap gain coefficients can be established for the equalizer itself. In conventional systems it has been the general practice to adjust each of these parameters independently, while holding the others fixed, until it can be reasonably assumed that a workable set of adjustments has been realized. The full conditioning time consumed in this way can extend to periods measured in seconds, whereas a typical polling message can be transmitted in a fraction of a second.

It is an object of this invention to reduce the conditioning time for receivers in synchronous digital data systems to a period comparable with message lengths in polling situations.

It is another object of this invention to provide for joint initial setting of at least two parameters affecting initial convergence of an automatic equalizer in digital data transmission systems.

It is a further object of this invention to provide for joint initial setting of sampling time and equalizer tap gain coefficients in a receiver for synchronous digital data transmission.

SUMMARY OF THE INVENTION

The above and other objects of this invention are attained by providing in a digital data receiver including an automatic transversal equalizer a preliminary correlator for received actual data signals which have traversed a distorting transmission channel and desired signals, means for applying correlated signals to the equalizer proper, resistive matrix means for removing the correlation from, or orthogonalizing, time-spaced samples of the correlated signals appearing at consecutive taps on the equalizer, means for applying orthogonalized samples of received signals from the matrix means as tap gain coefficients for the weighting attenuators of the equalizer, detector means for determining the instant of time when the peak occurs in the combined output signal resulting from weighting the equalizer signals by the tap gain coefficients, and means for synchronizing the receiver sampling time circuit with the time of occurrence of the peak of the combined output signal.

The operation of the inventive arrangement is such that in a training period prior to message data transmission two or more test pulses are transmitted at integral multiples of the synchronous rate intended to be employed for message transmission. Each received test pulse is correlated with a desired test pulse generated at the receiver. The resultant signal traverses the equalizer to produce time-spaced samples for selective weighting and recombination into an equalized output signal. These same samples are additionally operated on by a matrix of fixed resistive attenuators to produce a mutually orthogonal set of control signals which take into account the amplitude characteristics of the distorting transmission medium and the spectral shaping of the selected signal processing. The control signals from the matrix are fed to the variable tap attenuators for the equalizer for proportional adjustment, thus forming a composite equalizer output whose peak amplitude coincides with the optimum receiver sampling instant. The peak amplitude of the composite equalizer output is detected and a receiver timing circuit is synchronized therewith.

Upon the receipt of the first test pulse a coarse setting of the variable tap attenuators is made. This setting is of sufficient precision, however, that the peak of the equalizer output establishes the optimum sampling time instant. When a second test pulse is received and operated on by the correlation circuit and an inverse orthogonalization matrix, the control signals from the matrix are gated to the variable tap attenuators at the optimum sampling instant ascertained from the peak detection of the first test pulse. In the absence of excessive noise optimum sampling time and initial equalizer tap weights are determined from the transmission of only two test pulses spaced by the order of 20 symbol intervals. For a noisy channel the transmission of several groups of test pulses in which peak detection is alternated with tap weight adjustment will average out the noise.

After tap weights and sampling time are optimized at the receiver, the peak detection, inverse orthogonalization matrix and correlation circuit can be removed from the operating circuit and conventional adaptive control of the tap weights can then be substituted.

The arrangement of this invention is applicable to single, double and vestigial-sideband amplitude-modulation transmission systems as well as to baseband systems.

It is a feature of this invention that the modifications of the conventional transversal equalizer required for its practice can be implemented with either digital elements such as binary multipliers, or with analog elements, such as resistive multipliers.

DESCRIPTION OF THE DRAWING

The foregoing and other objects and features of the invention will become apparent from the following detailed description when read in conjunction with the accompanying drawing in which.

DETAILED DESCRIPTION

Figures 1, 2A, 2B:
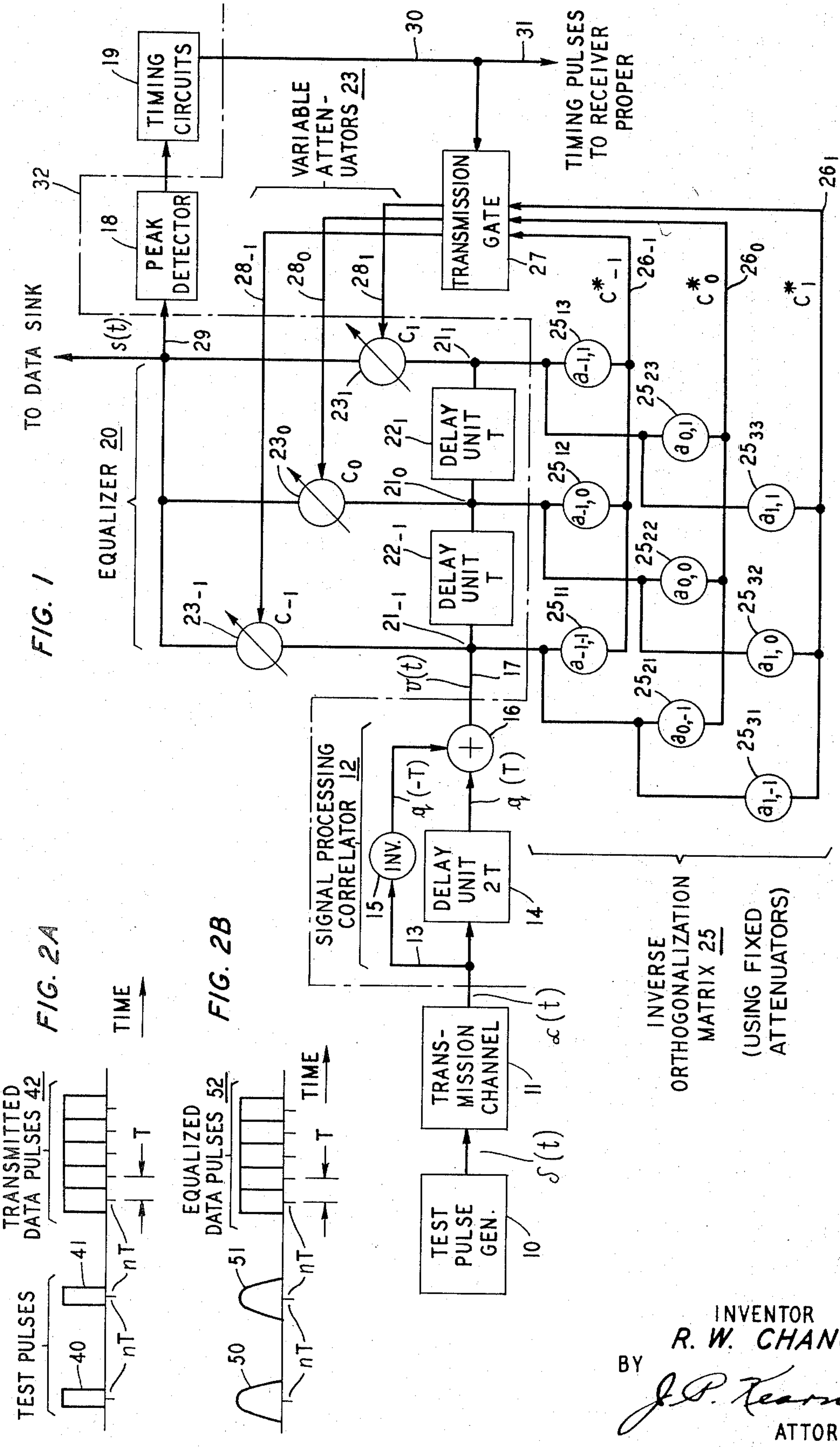
FIG. 1 is a block schematic diagram of a transversal equalizer modified according to this invention for joint initial setting of receiver timing phase and equalizer tap gains to achieve fast start up.
FIGS. 2A and 2B are waveform diagrams of test and data pulses as they respectively appear at the transmitter and receiver in a data transmission system being prepared for message handling.

FIG. 1 illustrates an automatic transversal equalizer modified according to this invention for fast start-up performance by joint initial setting of receiver timing phase and tap gain coefficients.

The basic equalizer is of the type disclosed in U.S. Pat. No. 3,375,473 issued to R. W. Lucky on Mar. 26, 1968, which operates to minimize the mean-square error difference between its output and a reference signal generated in the receiver. As shown in FIG. 1 the basic equalizer comprises a delay line having a plurality of equal delay units 22 and exhibiting tapping points 21 at intermediate and end points, a plurality of tap weighting elements 23 connected one to each tap, and a summing element represented here as bus 29. Unequalized signals are introduced at the input (tap $21_{-1}$) of the delay line and equalized signals are obtained on summing bus 29 for application to a data utilization circuit or sink (not shown in FIG. 1).

As an aid in the understanding of this invention, a brief analysis of the mean-square equalizer is given. The equalizer is designed to minimize the error quantity $E$ expressed as $$E=\int_{-\infty}^{\infty}[s(t)-q(t-t_0)]^2dt, \qquad (1)$$

where $s(t)$ = the impulse response realized by the combination of transmission channel and equalizer, $q(t)$ = the desired impulse response, and $t_0$ = receiver sampling time taking into account inherent delay in the transmission channel.

The signal $s(t)$ appears on summing bus 29 in FIG. 1 and can be expressed as follows:

$$s(t)=\ldots+c_{-1}\alpha(t+T)+c_0\alpha(t)+c_1\alpha(t-T)+\ldots,$$

$$=\sum_{k=-N}^{N}c_k\alpha[t-kT] \qquad (2)$$

where $T$ = tap spacing and symbol interval, $\alpha(t)$ = received demodulated impulse, $k$ = index of taps, $c_k$ = tap weighting coefficients, and $N$ = number of taps preceding and following the reference tap on the equalizer.

Since the equalizer is part of a sampled digital data transmission system, it is appropriate to rewrite equation (1) in terms of time samples in which $s(t)$, $q(t)$ and $\alpha(t)$ are replaced by $s_k$, $q_k$ and $\alpha_k$, where $s_k = s(t_0 + kT + NT)$, $q_k=q(kT + NT)$ and $\alpha_k=\alpha(t_0 - kT)$. Thus, equation (1) becomes $$E=\sum_{k=-\infty}^{\infty}(s_k-q_k)^2 \qquad (3)$$

Performance of the indicated multiplication in equation (3) yields $$E=\sum_{k=-\infty}^{\infty}[s_k^2-2s_kq_k+q_k^2]$$

$$=\sum_{k=-\infty}^{\infty}s_k^2-2\sum_{k=-\infty}^{\infty}s_kq_k+\sum_{k=-\infty}^{\infty}q_k^2 \qquad (4)$$

The first summation term of the second line of equation (4) becomes from equation (2) the summation of the cross-products of the respective tap signals $\alpha_k$ taken in pairs with the tap coefficient $c_k$. Thus, in matrix form $$\sum_{k=-\infty}^{\infty}s_k^2=C'AC \qquad (5)$$

where $C$ = a column matrix formed of the tap coefficients . . . $c_{-1}, c_0, c_1 \ldots$, $C'$ = the transpose of $C$, a row matrix, and $A$ = a square matrix whose elements are cross-products of all the tap signals taken in pairs, the orthogonalization matrix.

The second summation term of the second line of equation (4) represents the summation of the cross-products of the tap signals and the reference signals as operated on by the tap coefficients. Thus, in matrix form $$2\sum_{k=-\infty}^{\infty}s_kq_k=2\underline{C'}\underline{V} \qquad (6)$$

where $V$ = a column matrix whose elements are the cross correlation of actual tap signals and time samples of the reference signal. Consequently, equation (4) can be rewritten in matrix form as $$E=\underline{C'}\,\underline{AC}-2\underline{C'}\underline{V}+\sum_{k=-\infty}^{\infty}q_k^2 \qquad (7)$$

When the partial derivative of equation (7) is taken with respect to the tap coefficients and set equal to zero to determine the occurrence of the minimum, it is found that error $E$ is minimized when $$C=A^{-1}V, \qquad (8)$$

where $A^{-1}$ = the reciprocal or inverse of the $A$ matrix.

Equation (8) states that the optimum value of the tap coefficients is a function of the tap signals and the cross-correlation between the tap signals and the reference signals. Since the tap signals are sampled values, the optimum values of tap coefficients depend critically on sampling time and demodulating carrier phase.

I have discovered, however, that in single sideband amplitude-modulation systems, the $A$ matrix is independent of demodulating carrier phase for the reason that the demodulated positive and negative frequency spectra do not overlap as they do with vestigial- or double-sideband systems. Accordingly, calculation of the elements of the $A$ matrix becomes possible in a straightforward manner for a single-sideband amplitude-modulation system.

Analysis of the $A$ matrix shows that each element is a correlation function of simultaneous time samples. This time function can be transformed into the frequency domain in the following form $$a_{ij}=f_0\int_0^{f_0}[\cos 2\pi f(i-j)T]H(f)^2df \qquad (9)$$

where $i$ = row index of the $A$ matrix, $j$ = column index of the $A$ matrix, $f_0$ = bandwidth of the transmission channel, $T$ = symbol or sampling interval, $H(f)$ = shaping function of the transmission channel.

The shaping function $H(f)$ is a composite of the respective shaping functions of the transmitting and receiving filters and the transmission channel itself. For purposes of specific example it is assumed that a Class IV partial-response signal (see in this connection U.S. Pat. No. 3,388,330 issued to E. R. Kretzmer on June 11, 1968) is being transmitted. This type of signal possesses an impulse response with positive and negative components spaced at an interval of $2T$. When such signals are transmitted at $T = ½f_0$ intervals, the effective transmission rate is doubled over practically attainable interference-free Nyquist rates at the expense of predictable intersymbol interference. However, the frequency shaping function becomes that of a single sine-wave cycle instead of the "brick-wall" shaping function required for Nyquist transmission at the maximum theoretical rate of $2f_0$. Class IV partial-response signals, despite their desirable double-speed transmission rates and easily realized frequency spectra, nevertheless are highly correlated with the result that convergence time of automatic equalizers for such signals is normally much prolonged over that for conventional Nyquist signals. The orthogonalization properties of the $A$ matrix aid in reducing convergence time for partial-response equalizers, as is disclosed in my copending application Ser. No. 143,021, filed May 13, 1971. Accordingly, for illustrative purposes let the single-sideband shaping function be $$H(f) = \sin \pi f/f_0. \qquad (10)$$

Equation (10) can be substituted in equation (9) and solved for the respective elements of matrix $A$. Thus, reduced to lowest terms.

$$\begin{aligned} &a_{ij} = 1 \text{ for } i=j \\ &a_{ij} = -½ \text{ for } i-j=\pm 2 \qquad (11) \\ &a_{ij} = 0 \text{ otherwise.} \end{aligned}$$

The $A$ matrix for Class IV partial-response shaping based on equation (11) is of the following symmetrical form $$\underline{A}=\begin{bmatrix} 1 & 0 & -\frac{1}{2} & 0 & \cdots & 0 \\ 0 & 1 & 0 & -\frac{1}{2} & \cdots & 0 \\ -\frac{1}{2} & 0 & 1 & 0 & \cdots & 0 \\ 0 & -\frac{1}{2} & 0 & 1 & \cdots & 0 \\ \cdot & \cdot & \cdot & \cdot & & \cdot \\ \cdot & \cdot & \cdot & \cdot & & \cdot \\ 0 & 0 & 0 & 0 & \cdots & 1 \end{bmatrix} \qquad (12)$$

The inverse matrix $A^{-1}$, i.e., the matrix which multiplies the $A$ matrix to produce the identity matrix, all of whose elements are zero except for those of unit value on the principal diagonal, can be calculated from the $A$ matrix by standard manipulation as described in texts such as F. M. Stein's *Introduction to Matrices and Determinants* (Wadsworth Publishing Company, Incorporated, Belmont, Calif., 1967).

In the case of a three-tap equalizer the $A$ matrix has three rows and three columns, thus $$\underline{A}=\begin{bmatrix} 1 & 0 & -\frac{1}{2} \\ 0 & 1 & 0 \\ -\frac{1}{2} & 0 & 1 \end{bmatrix} \qquad (13)$$

Its equivalent determinant is evaluated at three-fourths. Its cofactor matrix (replacing each element by its cofactor) is $$\text{cofactor } \underline{A}=\begin{bmatrix} 1 & 0 & \frac{1}{2} \\ 0 & \frac{3}{4} & 0 \\ -\frac{1}{2} & 0 & 1 \end{bmatrix}=\underline{A}' \qquad (14)$$

Since equation (14) is symmetrical about the principal diagonal (downward from left to right), its transpose (row and column elements interchanged) is identical. Dividing each element of equation (14) by determinant $A$ results in the inverse matrix $$\underline{A}^{-1}=\begin{bmatrix} \frac{4}{3} & 0 & \frac{2}{3} \\ 0 & 1 & 0 \\ \frac{2}{3} & 0 & \frac{4}{3} \end{bmatrix} \qquad (15)$$

The elements of the corresponding $A$ matrix and its inverse for other signaling schemes and larger number of taps are more susceptible to determination by computer program.

The other element of equation (8) which must be accounted for is the $V$ matrix. The $V$ matrix is found to be a column matrix only. Each of its elements is a correlation of a tap signal and a reference signal. Thus, $$\begin{aligned} v_n &= \sum_{k=-\infty}^{\infty} q_k a_{n-k} \\ &= \sum_{i=1}^{L} q(k_iT+NT)\alpha(t-nT+k_iT) \end{aligned} \qquad (16)$$

where $L$ = number of nonzero samples in the ideal impulse response, $N$ = number of equalizer taps, $k$ = index of samples, and $n$ = index of equalizer taps.

Equation (16) states that each element $v_n$ of the column matrix $V$ is the summation of prescribed cross-products of actual and ideal signal samples. Where the number of nonzero samples $k$ of the ideal impulse response is greater than two, equation (16) can be implemented in a tapped delay line structure having a multiplier connected from each tap to a combining circuit. To each multiplier is applied the appropriate ideal signal sample. Thus, the first signal sample is multiplied by the $L$th nonzero ideal sample.

In the Class IV partial-response signal there are only two nonzero samples (+1 and −1) separated by a $2T$ time interval. Therefore, the $q_k$ multipliers in equation (16) are respectively +1 and −1. A multiplier of +1 value is realized with a direct connection and a multiplier of value −1 is represented by an inverter. Thus, in the Class IV case it is unnecessary actually to generate the ideal reference signal. It is merely necessary to combine the inverted received signal $\alpha(t)$ with the received signal delayed by two signaling intervals $\alpha(t-2T)$ to form the elements $V_n$ of the column matrix $V$.

From equation (7) it can be deduced that when the tap coefficients $c$ are set according to equation (8) the time at which the error $E$ is minimized is that at which vector product $C'V$ is maximized. To form the product $C'V$ the tap signals on the equalizer, representing delayed samples of $v_k$, are multiplied by the tap attenuator coefficients $c_k$ established by the operation of the resistive matrix implementing the inverse $A$ matrix on the same delayed samples $v_k$. The signals resulting from the last-mentioned operation are fed back to the tap attenuators to determine their gain values. The summation of the products of the respective tap signals and their associated tap attenuator coefficients yields a signal whose peak occurs at the optimum sampling time.

From the output of the peak detector a signal is obtained for synchronizing a local receiver timing generator. A second test pulse can then be transmitted. The corresponding received test pulse is then operated on by a signal processing unit to form the $v_k$ values, delayed in the equalizer to form tap signals, i.e., delayed $v_k$ values, and orthogonalized by the inverse $A$ matrix. On the second pulse, however, the outputs of the inverse $A$ matrix are arranged to be gated to the tap attenuators at the proper sampling time in order that the tap attenuator settings will be optimal. Provided that noise in the transmission channel is not excessive, the transmission of two test pulses will suffice to (1) establish optimum sampling time and (2) generate optimum tap attenuator settings. If noise does prove to be excessive, then the transmission of additional test pulses may become necessary to average out the noise, which is statistically random.

FIG. 1 is a block schematic diagram of a transversal equalizer modified according to this invention for joint optimum setting of sampling time and tap attenuator gains when a Class IV partial response data signal is to be transmitted. That part of FIG. 1 lying above broken line 32 represents the conventional equalizer. That part lying below broken line 32 constitutes the inventive improvement.

Overall FIG. 1 shows a test pulse generator 10 at the transmitting end of the data system. It is to be understood that during message data transmission generator 10 will be replaced by a data transmitter. The test pulse $\delta(t)$ emitted from generator 10 is shaped by transmission channel 11 by reason of its transmitting and receiving filters (not shown) to the sinusoidal spectral shape indicated by equation (10) in the case of a Class IV partial-response signal. The shaped channel output is designated $\alpha(t)$ and during message reception would be connected directly to lead 17 at the input of the equalizer at the receiving end of the system.

The transversal equalizer 20 comprises a plurality of delay units 22, of which two designated $\mathbf{22}_{-1}$ and $\mathbf{22}_1$ are shown, with input intermediate and output taps 21 designated respectively $\mathbf{21}_{-1}$ at the input, $\mathbf{21}_0$ at the intermediate position and $\mathbf{21}_1$ at the output. The equalizer 20 further comprises at each tap a variable attenuator 23, represented schematically by circles with arrowed adjusting arms. These tap attenuators are designated $\mathbf{23}_{-1}$, having the coefficient value $c_{-1}$ at tap $\mathbf{21}_{-1}$; $\mathbf{23}_0$, having the coefficient value $c_0$; and $\mathbf{23}_1$, having the coefficient $c_1$. The outputs of all the attenuators are combined on a common bus 29 to form an output signal $s(t)$. The coefficient values of attenuators 23 are adaptively controlled during message transmission by comparing the output signal 29 with an estimated or absolute reference signal to form an error signal, which is then correlated with the signals at taps 21 to generate control signals for variable attenuators 23. This error generation circuit is not shown to avoid cluttering the drawing.

Associated with every synchronous data receiver is a timing circuit, represented here by block 19, for the purpose of providing sampling pulses over leads 30 and 31 to data decision circuits at the proper bit times to achieve optimum performance. The timing circuit is commonly synchronized with some periodic condition in the received wave, such as zero crossings or accompanying pilot waves. The problem that generally arises is that of obtaining initial synchronization without sending a long starting sequence.

According to this invention a signal processor 12 is inserted between the output of the transmission channel and the input of the transversal equalizer to transform the actual received signal $\alpha(t)$ into a compensated signal $v(t)$ as required by equation (16). On the assumption that Class IV partial-response signaling is being employed processor 12 comprises delay unit 14 having a delay of $2T$ units, signal inverter 15 and summing circuit 16. Signals $\alpha(t)$ are applied directly to delay unit 14 and to inverter 15 by way of lead 13. The respective outputs of delay unit 14 and inverter 15 are designated $q(\mathrm{T})$ and $q(-\mathrm{T})$. For Class IV signals $q(\mathrm{T})$ and $q(-\mathrm{T})$ are plus and minus one. These outputs are combined in summer 16. Effectively each sample of received signal $\alpha(t)$ is multiplied by minus one and is combined in summer 16 with a received signal $\alpha(t-2T)$ which has been multiplied by plus one for a succession of compensated signals $v(t)$. As previously explained, if the chosen signal format resulted in an impulse response with more than two nonzero samples a tapped delay unit would be required to separate these samples so that each one could be individually multiplied by the corresponding reference sample value before summation.

Further according to this invention, an inverse orthogonalization matrix 25 is connected between the several taps 21 on transversal equalizer 20 and the tap attenuators 23 to implement equation (8). Matrix 25 is a square matrix having as many elements, represented by fixed gain units $\mathbf{25}_{11}$, $\mathbf{25}_{12}$, $\mathbf{25}_{13}$, etc., arranged in as many rows and columns as there are taps 21 on delay line 22. In the three-tap delay line shown in FIG. 1 there is a column of three gain elements with their inputs connected to each tap, such as the left column including elements $\mathbf{25}_{11}$, $\mathbf{25}_{21}$, and $\mathbf{25}_{31}$ connected to tap $\mathbf{21}_{-1}$. The outputs of elements 25 are further connected in rows to buses 26, such as the top row containing elements $\mathbf{25}_{11}$, $\mathbf{25}_{12}$ and $\mathbf{25}_{13}$ whose inputs are connected to each of taps 21 and whose outputs are connected in common to lead $\mathbf{26}_{-1}$, also labeled $C_{-1}$*. All the gain elements 25 together implement the inverse $A$ matrix of equation (15), which defines a 3×3 square matrix as follows $$\underline{A}^{-1}=\begin{bmatrix} a_{-1,-1} & a_{-1,0} & a_{-1,1} \\ a_{0,-1} & a_{0,0} & a_{0,1} \\ a_{1,-1} & a_{1,0} & a_{1,1} \end{bmatrix} \qquad (17)$$

Elements 25 in FIG. 1 are labeled in accordance with matrix (17), every element of which corresponds in row and column position to the matrix of equation (15). It may be observed that four of the elements have zero values indicating an open circuit; namely, $a_{-1,0}$, $a_{0,-1}$, $a_{0,1}$ and $a_{1,0}$. The center element has unit value, indicating a direct connection. The upper left and lower right elements have the gain values 4/3, implemented by an integrated circuit amplifier. The other two corner elements have like gain values of 2/3, which are readily implemented by a resistive divider. Equivalently, the matrix can be scaled down to be entirely resistive and passive by taking 3/4 of each element value and providing a gain in each output lead of value 4/3. Following the latter alternative the complete inverse orthogonalization matrix 25 can be constructed in thin-film form.

The row outputs of matrix 25 appear on leads $\mathbf{26}_{-1}$, $\mathbf{26}_0$ and $\mathbf{26}_1$ respectively as variable attenuator control signals $c_{-1}^*$, $c_0^*$ and $c_1^*$. For initial test pulses these signals on leads 26 are applied directly to tap attenuators 23 on extension leads $\mathbf{28}_{-1}$, $\mathbf{28}_0$ and $\mathbf{28}_1$. On subsequent test pulses these control signals are gated at the optimum sampling times through transmission gate 27.

The combined equalizer output on summing bus 29 is monitored for the occurrence of a peak amplitude in peak detector 18. Timing circuit 19, which is arranged to have a free-running frequency slightly faster than the anticipated bit frequency, is synchronized with the output of peak detector 18. The output of timing circuit 19, on the other hand, operates transmission gate 27 over lead 30 and other parts of the receiver (such as the data decision circuit not shown) over lead 31.

FIGS. 2A and 2B depict waveforms showing a workable time sequence for test and data pulses in the operation of the improved equalizer fast start-up circuit of this invention. Pulses 40 and 41 in FIG. 2A represent test pulses transmitted at intervals integrally and precisely related to the planned data signal intervals. The integral value $n$ is conveniently chosen to be 20. Pulses 50 and 51 in FIG. 2B represent the same pulses after being spread out in time due to traversing the transmission channel. Pulses 42 in FIG. 2A illustrate a train of data pulses transmitted at synchronous intervals T exactly $n$ intervals after the last test pulses. Pulses 52 in FIG. 2B indicate these same data pulses 42 after equalization at optimum sampling time instants.

The circuit of FIG. 1 can be arranged in a straightforward manner so that the elements below the dash line 32 can be removed from the circuit after initialization to be made available to another similar data receiver at the same location.

While this invention has been disclosed by way of a specific embodiment utilizing a particular signaling format, it will be understood by those skilled in the art that variations in form may be made without departing from the spirit and scope of the following claims.

What is claimed is:

1. In combination with a receiver for a synchronous data transmission system in which variable attenuators connected to tops on an associated transversal equalizer having an output are adjusted by comparing actual received signals with predetermined reference signals at sampling times determined by a local timing generator, means for jointly establishing initial sampling instants and tap attenuator settings comprising means for correlating received signal samples with said predetermined reference signal to form compensated signals, means for applying said compensated signals to said transversal equalizer, a matrix of fixed resistive elements for operating on compensated signals appearing at taps on said equalizer to form control signals, each of said control signals including a weighted contribution from at least one of said taps, means for feeding said control signals to said variable attenuators for adjustment to proportional coefficient values, means for synchronizing said timing generator with the time of occurrence of the peak amplitude of the output of said equalizer after initial adjustment of said variable attenuators, and means under the control of said timing generator for gating said control signals to said variable attenuators to establish optimum settings therefor.

2. The combination defined in claim 1 in which said received signals possess an impulse response having more than one nonzero sample at synchronous sampling instants and said correlating means comprises means for multiplying each nonzero received signal sample by each corresponding reference signal value and means for combining all the products obtained at a given sampling instant by said multiplying means to form said compensated signals.

3. The combination defined in claim 1 in which said received signals possess an impulse response having two oppositely poled nonzero samples spaced in time by two sampling intervals and said correlating means comprises means for multiplying respective nonzero samples of said actual received signals by the factors plus and minus one and means for combining the two products obtained at a given sampling instant by said multiplying means to form said compensated signals.

4. The combination defined in claim 1 in which said matrix comprises a plurality of resistive weighting elements whose weighting coefficients are chosen with reference to the signal impulse response and amplitude characteristics of said transmission system to operate on said compensated signals to produce said control signals.

5. The combination defined in claim 1 in which the amplitude characteristic $H(f)$ of said transmission system is single-sideband and proportional to $$\sin \pi f/f_0,$$

where $f$ = any frequency within the bandwidth of said system, $f_0$ = the bandwidth of said system;

each element $a_{ij}$ or an orthogonalization matrix of coefficients which operates on signals appearing at the taps on said equalizer to render them mutually orthogonal are proportional to $$f_0 \int_0^{f_0} [\cos \pi f(i-j)/f_0] H(f)^2 df$$

where $i$ = row index of each matrix element, $j$ = column index of each matrix element; and each element of said matrix of fixed resistive elements has the coefficient value of the inverse of said orthogonalization matrix determined by replacing each element $a_{ij}$ by its cofactor divided by the determinant value corresponding to said orthogonalization matrix.

6. The combination defined in claim 1 in which said synchronizing means comprises a peak detector producing a discrete output when the maximum value of an analog signal is measured.

7. The method of rapid initial joint optimum adjustment of sampling time and variable attenuator settings in a synchronous data transmission system including a tappered transversal equalizer having a variable attenuator at each of such taps and a timing generator associated with a receiver for such system comprising the steps of transmitting a first isolated test pulse, correlating said test pulse as received with nonzero samples of an ideal reference signal to form signals compensated for signaling format, applying said compensated signals to said equalizer, operating on tap signals in said equalizer by factors proportional to the elements of a matrix of coefficient values which is the inverse of a matrix which renders all of said tap signals mutually orthogonal to form control signals, adjusting said variable attenuators proportionately to said control signals, determining the instant of occurrence of the peak amplitude of the output of said equalizer derived from combined tap signals operated on by said variable attenuators, synchronizing said timing generator with the time of occurrence of said peak amplitude, transmitting one or more subsequent test pulses spaced from said first test pulse by precise integral multiples of the synchronous sampling interval, readjusting said variable attenuators responsive to one or more of said subsequent test pulses to optimum values at sampling instants determined by said timing generator as synchronized with said first test pulse.

* * * * *